US011009767B2

(12) United States Patent
Johnson et al.

(10) Patent No.: US 11,009,767 B2
(45) Date of Patent: May 18, 2021

(54) OPTICAL BEAM PROCESSING DEVICE

(71) Applicant: KONINKLIJKE PHILIPS N.V., Eindhoven (NL)

(72) Inventors: Mark Thomas Johnson, Eindhoven (NL); Franciscus Johannes Gerardus Hakkens, Eersel (NL); Achim Hilgers, Alsdorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 77 days.

(21) Appl. No.: 16/461,807

(22) PCT Filed: Nov. 21, 2017

(86) PCT No.: PCT/EP2017/079969
§ 371 (c)(1),
(2) Date: May 17, 2019

(87) PCT Pub. No.: WO2018/091749
PCT Pub. Date: May 24, 2018

(65) Prior Publication Data
US 2019/0361318 A1 Nov. 28, 2019

(30) Foreign Application Priority Data

Nov. 21, 2016 (EP) ..................................... 16199843

(51) Int. Cl.
*G02F 1/01* (2006.01)
*G02F 1/29* (2006.01)

(52) U.S. Cl.
CPC .............. *G02F 1/29* (2013.01); *G02F 1/0128* (2013.01)

(58) Field of Classification Search
CPC .. G02F 1/0045; G02F 1/1396; G02F 2202/36; G02F 1/0128; G02F 1/29
USPC ........ 359/237, 265–267, 273–275, 321–323, 359/290–292, 295, 296, 298
See application file for complete search history.

(56) References Cited

U.S. PATENT DOCUMENTS

| 7,015,624 | B1 | 3/2006 | Su et al. | |
|---|---|---|---|---|
| 7,094,902 | B2 * | 8/2006 | Roberts | ................. B41M 5/395 345/30 |
| 2002/0175594 | A1 | 11/2002 | Kornbluh et al. | |
| 2004/0179766 | A1 | 9/2004 | Williams et al. | |

(Continued)

FOREIGN PATENT DOCUMENTS

| WO | 0106579 A2 | 1/2001 |
|---|---|---|
| WO | 2005085930 A1 | 9/2005 |

(Continued)

OTHER PUBLICATIONS

S. Somiya "Handbook of Advanced Ceramics: Materials, Applications . . . " Academic Press, 2013 p. 415.

(Continued)

*Primary Examiner* — Brandi N Thomas
(74) *Attorney, Agent, or Firm* — Schott, P.C.

(57) ABSTRACT

A light transmissive optical component comprising an electroactive material layer structure having a controlled deformation. When actuating the component, different relative thickness changes are implemented at different regions of the electroactive material layer thereby providing a non-uniform change in an optical function between those different regions.

20 Claims, 3 Drawing Sheets

(56) References Cited

U.S. PATENT DOCUMENTS

| | | | |
|---|---|---|---|
| 2004/0202414 A1 | 10/2004 | Wong et al. | |
| 2005/0157893 A1* | 7/2005 | Pelrine | B64C 23/005 |
| | | | 381/190 |
| 2007/0223118 A1* | 9/2007 | Dupuis | G02B 26/06 |
| | | | 359/846 |
| 2007/0263963 A1 | 11/2007 | Hughes et al. | |
| 2013/0176608 A1 | 7/2013 | Brokken et al. | |
| 2014/0333989 A1* | 11/2014 | Whitehead | G02F 1/133514 |
| | | | 359/296 |

FOREIGN PATENT DOCUMENTS

| | | |
|---|---|---|
| WO | 2012032447 A1 | 3/2012 |
| WO | 2016156175 A1 | 10/2016 |

OTHER PUBLICATIONS

F. Carpi et al "Dielectric Elastomers as Electromechanical Transducers" Oxford 2011, p. 53.
International Search Report dated Mar. 28, 2018.

\* cited by examiner

OPTICAL BEAM PROCESSING DEVICE

CROSS-REFERENCE TO PRIOR APPLICATIONS

This application is the U.S. National Phase application under 35 U.S.C. § 371 of International Application No. PCT/EP2017/079969, filed on Nov. 21, 2017, which claims the benefit of EP Patent Application No. EP 16199843.0, filed on Nov. 21, 2016. These applications are hereby incorporated by reference herein.

FIELD OF THE INVENTION

This invention relates to controllable devices for processing an optical beam.

BACKGROUND OF THE INVENTION

There are many situations in which light output from a system is to be processed, for example to change a light color, light output direction or light intensity.

There various devices which process a light output to create these changes in optical properties. Generally, an overall change is implemented by an optical component.

There are situations in which a non-uniform change in optical properties is desired across an area. This can be achieved using an array of control devices, but this results in a complicated structure.

By way of example, for automotive headlights it is desirable to be able to tune different optical effects. These effects may include light intensity, color, diffusivity, refractive index, and the distribution of these effects within a light beam. Depending on conditions like weather, darkness, orientation with respect to the road, other traffic etc. it is beneficial to be able to tune some or all of these effects.

Furthermore, depending on the position in the light beam it is beneficial to have larger or smaller changes.

WO 2005/085930 discloses an adaptive optical element in the form of a lens formed of an electroactive polymer material, in which the lens shape is electrically controlled. U.S. 2007/263963 discloses an alignment system in which actuators control the shape of an optical prism for controlling the direction of a light beam.

It would be desirable to be able to control an optical property in a non-uniform way across an area, but with a simple device structure.

SUMMARY OF THE INVENTION

According to a first aspect of the invention, there is provided a light transmissive optical component comprising:
  an electroactive material layer structure comprising an optically active layer which implements an optical function;
  an electrode arrangement for controlling deformation of the electroactive material layer structure thereby to change a light transmission property of the component; and
  a drive arrangement for controlling drive signals applied to the electrode arrangement,
  wherein the drive arrangement is adapted to induce different relative thickness changes at different regions of the electroactive material layer structure thereby providing non-uniform change in optical function between those different regions,
  wherein the electroactive material layer structure comprises a stack of electroactive material layers separated by intermediate layers, wherein the electroactive material layers have uniform thickness and the intermediate layers have non-uniform thickness such that the electroactive material layer structure has a non-uniform thickness in its non-actuated state.

This component processes an optical beam which is transmitted through the component. Different parts of the optical beam have different optical function applied to them in dependence on the actuation of the electroactive material layer. In particular, there is different relative change in thickness of the layer at different locations of the two dimensional layer structure. This non-uniform thickness change takes place between actuated part of the layer structure, i.e. between the actuation electrodes when they are provided on opposing faces.

The electroactive material forms a "structure" in the sense that it may be a single layer or a multi-layer arrangement. It is "optically active" in the sense that it implements an optical function rather than being transparent. The optical function may be deflection for example caused by a refractive index boundary, light scattering (to change the spread of the output light), light absorption or wavelength (i.e. color) manipulation.

The electroactive material layer structure has a non-uniform thickness in its non-actuated state. Regions of different thickness will give different levels of absorption, scattering or wavelength change (as the case may be), or else the overall shape may perform a beam steering function based on an angle between opposing faces of the electroactive material layer structure.

The electroactive material layer structure comprises a stack of electroactive material layers separated by intermediate layers, wherein the electroactive material layers have uniform thickness and the intermediate layers have non-uniform thickness. The different thickness of the intermediate layers at different locations gives rise to a difference in (effective) dielectric constant and for an electric field controlled device. This then alters the prevailing electric field at different parts of the device.

At least some different regions of the electroactive material layer structure may have different dielectric constant. In another arrangement, at least some different regions of the electroactive material layer structure may have different stiffness. Local dielectric or stiffness control influences how the electroactive material layer structure deforms locally in response to an applied general actuation signal.

For this purpose, the electroactive material layer structure may comprise a composite of an electroactive material and particles for locally modifying the dielectric constant or stiffness.

According to a second aspect of the invention, there is provided a light transmissive optical component comprising:
  an electroactive material layer structure comprising an optically active layer which implements an optical function;
  an electrode arrangement for controlling deformation of the electroactive material layer structure thereby to change a light transmission property of the component; and
  a drive arrangement for controlling drive signals applied to the electrode arrangement,
  wherein the drive arrangement is adapted to induce different relative thickness changes at different regions of the electroactive material layer structure thereby providing non-uniform change in optical function between those different regions, wherein at least some different regions of the electroactive material layer structure have different dielectric constant and/or stiffness.

As mentioned above, the local dielectric or stiffness control influences how the electroactive material layer structure deforms locally in response to an applied general actuation signal. Again, the electroactive material layer structure may comprise a composite of an electroactive material and particles for locally modifying the dielectric constant or stiffness.

In both aspects, the electrode arrangement may comprise an array of electrodes such that different actuation signals may be applied to the different regions of the electroactive material layer structure. The electroactive material layer structure is shared, but it is actuated in the manner of an array of individual devices. In this way, local thickness control or other local actuation may be implemented.

The electrode arrangement may comprise a signal processing unit associated with each electrode for processing a shared electrode drive signal to derive modified local electrode drive signals. Thus, a single control signal may be used, which is then converted locally to derive a set of different drive signals. The signal processing unit may implement control of a voltage for a field-driven electroactive material or implement control of a charge for an ionic electroactive material.

For all the different possible physical or electrical configurations, the electroactive material layer may in one example be a partial light absorbing layer or a light scattering layer. The local thickness then influences the local absorption or scattering which is implemented, so that a non-uniform intensity or scattering control is implemented.

For this purpose, the electroactive material layer may comprise a composite of an electroactive material and light absorbing or light scattering particles.

For all the different possible physical or electrical configurations, the electroactive material layer structure may instead comprise a refracting layer. This may be used to form a desired refractive index boundary. The electroactive material layer structure may comprise a composite of an electroactive material and particles of a different refractive index.

For all the different possible physical or electrical configurations, the electroactive material layer structure may instead be a light color change structure. This may be used for providing a non-uniform color output from an originally single color source. The electroactive material layer structure may for example comprise a composite of an electroactive material and color change particles. The color change particles for example comprise phosphor particles.

For all the different possible physical or electrical configurations, the electroactive material layer structure may instead be a light direction control layer. This provides control of a light output direction from the component.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a light transmissive optical component comprising an electroactive material layer structure having a controlled deformation. When actuating the component, different relative thickness changes are implemented at different regions of the electroactive material layer thereby providing a non-uniform change in an optical function between those different regions.

The invention makes use of an electroactive material (EAM), which is a class of materials within the field of electrically responsive materials. When implemented in an actuation device, subjecting an EAM to an electrical drive signal can make them change in size and/or shape. This effect can be used for actuation and sensing purposes.

There exist inorganic and organic EAMs.

A special kind of organic EAMs are Electroactive polymers (EAPs). Electroactive polymers (EAP) are an emerging class of electrically responsive materials. EAPs, like EAMs can work as sensors or actuators, but can be more easily manufactured into various shapes allowing easy integration into a large variety of systems. Other advantages of EAPs include low power, small form factor, flexibility, noiseless operation, and accuracy, the possibility of high resolution, fast response times, and cyclic actuation. An EAP device can be used in any application in which a small amount of movement of a component or feature is desired, based on electric actuation. Similarly, the technology can be used for sensing small movements. The use of EAPs enables functions which were not possible before, or offers a big advantage over common sensor/actuator solutions, due to the combination of a relatively large deformation and force in a small volume or thin form factor, compared to common actuators. EAPs also give noiseless operation, accurate electronic control, fast response, and a large range of possible actuation frequencies, such as 0-20 kHz.

Figure 1:
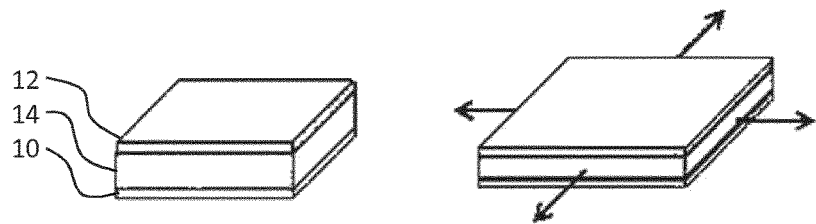
FIG. 1 shows a known electroactive polymer device which is not clamped.
Figure 2:
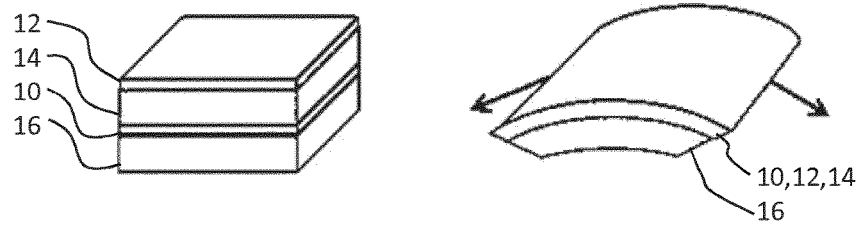
FIG. 2 shows a known electroactive polymer device which is constrained by a backing layer.

As an example of how an EAM device can be constructed and can operate, FIGS. 1 and 2 show two possible operating modes for an EAP device that comprises an electroactive polymer layer 14 sandwiched between electrodes 10, 12 on opposite sides of the electroactive polymer layer 14.

FIG. 1 shows a device which is not clamped to a carrier layer. A voltage is used to cause the electroactive polymer layer to expand in all directions as shown.

FIG. 2 shows a device which is designed so that the expansion arises only in one direction. To this end the structure of FIG. 1 is clamped or attached to a carrier layer 16. A voltage is used to cause the electroactive polymer layer to curve or bow. The nature of this movement arises from the interaction between the active layer which expands when actuated, and the passive carrier layer which does not.

Figure 3:
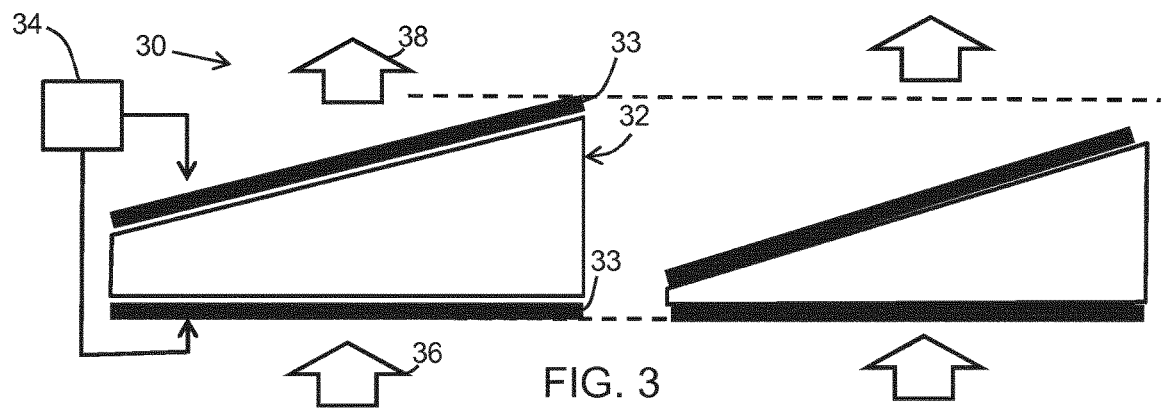
FIG. 3 shows a first example of a light transmissive optical component.

FIG. 3 shows a first example of a light transmissive optical component 30 which comprises an electroactive material layer structure 32 comprising an optically active layer which implements an optical function. An electrode arrangement is provided for controlling deformation of the electroactive material layer 32 thereby to change a light processing function, such as a light transmission, of the component. The electrode arrangement is shown as electrode layers 33 on opposite sides of the layer structure 32. However, a comb electrode arrangement may instead be provided on one side only.

A drive arrangement 34 is provided for applying drive signals to the electrode arrangement, thereby controlling the deformation of the electroactive material layer 32. For simplicity, it is shown only on the left image of Figure. The right image and most other figures omit the drive arrangement for the sake of simplicity.

FIG. 3 shows a non-actuated state on the left and an actuated state on the right. In this example, the layer structure has a wedge shape both in the non-actuated and actuated states. The actuation induces lateral expansion and thinning of the layer. The actuated state produces a non-uniform amount of deformation at different locations, because for a field driven device the electric field strength is different within the material at different locations of different thickness.

The actuation thus causes different relative thickness changes at different regions of the electroactive material layer. For example, the thinner side shown may reduce in thickness by 50% whereas the thicker side may reduce by 20%. This is what is meant by different relative thickness change, i.e. relative to the original thickness. The relative change is for example a function of the electric field strength. It may also mean that the wedge angle becomes different as between the non-actuated and actuated states. The change in the wedge angle will depend on the lateral width of the structure compared to the difference in thickness.

The electroactive material layer 32 implements an optical function. This may simply be that it has a refractive index which is different to the material outside the device, or it may be that there is light scattering, color changing, or other optical function. The result is that the component provides non-uniform change in optical function between those different regions when actuated. Typically, the optical function changes everywhere when the device is actuated, but the change is non-uniform.

The cause of the different relative thickness changes may be the general shape of the layer, or the electrode configuration, or the drive arrangement, or the local properties of the material of the layer. Various options are discussed below. However, in general the drive arrangement is adapted to induce different relative thickness changes at different regions of the electroactive material layer thereby providing the desired non-uniform change in optical function between those different regions.

The component processes an optical beam which is transmitted through the component. Different parts of the optical beam have different optical function applied to them in dependence on the actuation of the electroactive material layer. FIG. 3 shows the incident beam 36 and transmitted beam 38.

FIG. 3 shows the electroactive material layer structure 32 as a single layer. The thickness of the layer influences the optical function performed. The structure 32 may for example perform optical attenuation, scattering or color conversion, and the length of the path through the structure at each location determines the level of optical function applied.

For a layer structure with light absorbing properties, the optical function is to cause the intensity to change. Actuation of the device will result in a change of the intensity variation across the device. In the situation of FIG. 3, the intensity variation will be greater at the left hand side of the device than the right hand side: both sides of the device will become brighter, but the left hand side will become relatively more bright.

For a layer structure with light scattering properties, the optical function is to change the beam spread or degree of collimation. An initially collimated beam may become spread by different degrees at different areas of the device. Actuating the device will then cause a different non-uniform pattern of beam spread.

The device may have different sizes depending on the application. By way of example, the thickness of the device (the vertical direction in FIG. 3) may typically be between 50 micrometers and 1 mm. In general the actuator can be formed as a stack of thinner active layers.

The thin part of the wedge shape may for example have a thickness in the range 20-80% of the thickness of the thick part of the wedge. The device can be a square, or a disk or ring, with the thick part being at the inner diameter or outer diameter.

It is also possible for both an inner diameter (or one side) and the outer diameter (or an opposite side) are instance thin and that the thick part is between. The intermediate part may instead be the thinner part.

The lateral size will be typically be in the range of 1 mm and to tens of centimeters.

Figure 4:
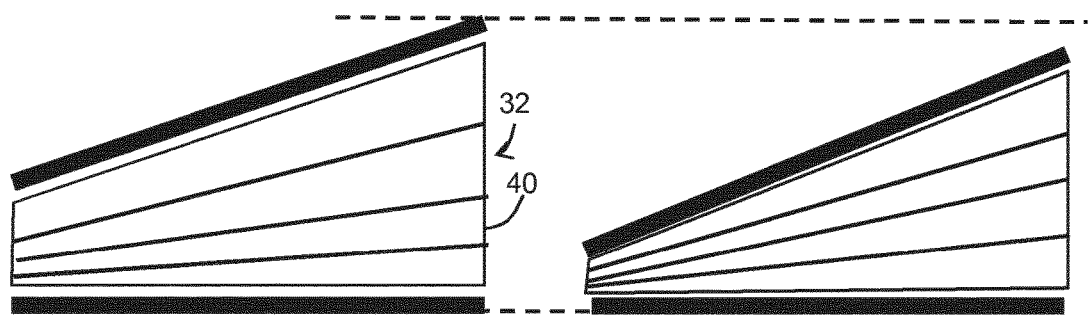
FIG. 4 shows a second example of a light transmissive optical component formed as a multi-layer structure.

FIG. 3 shows a single layer. The structure may instead comprise multiple layers 40 as shown in FIG. 4. The electroactive material layer structure 32 is thus formed as a stack of layers 40. The layers may all be the same, in which case the function is unchanged, and the purpose is simply for ease of manufacture, as a laminated stack of layers.

However, the stack may comprise alternate layers with different refractive index. They may all be electroactive materials, or there may be electroactive material layers interleaved with passive polymer layers. The refractive index boundaries then function as reflectors, so that the stack may implement the function of a dielectric grating, so that the transmitted light has a particular spectrum. This spectrum differs across the area of the device as a result of the different layer thicknesses at different locations. Actuation of the device also influences the layer thicknesses and hence the optical function.

The electroactive material thus forms a "structure" in the sense that it may be a single layer or (FIG. 3) a multi-layer (FIG. 4) arrangement.

The multilayer interference filter of FIG. 4 implements a color change. An alternative color control approach is to provide phosphor or other light converting particles within the layer structure 32. In this case, actuation of the device will result in a change of the color variation across the device. In the situation of FIG. 3, the color change will be greater at the left hand side of the device than the right hand side as the amount of phosphor changes more. Similarly, for the structure of FIG. 4, the spacing of the multilayer interference filter is reduced relatively more at the thinner areas hence giving a greater color change.

Figure 5:
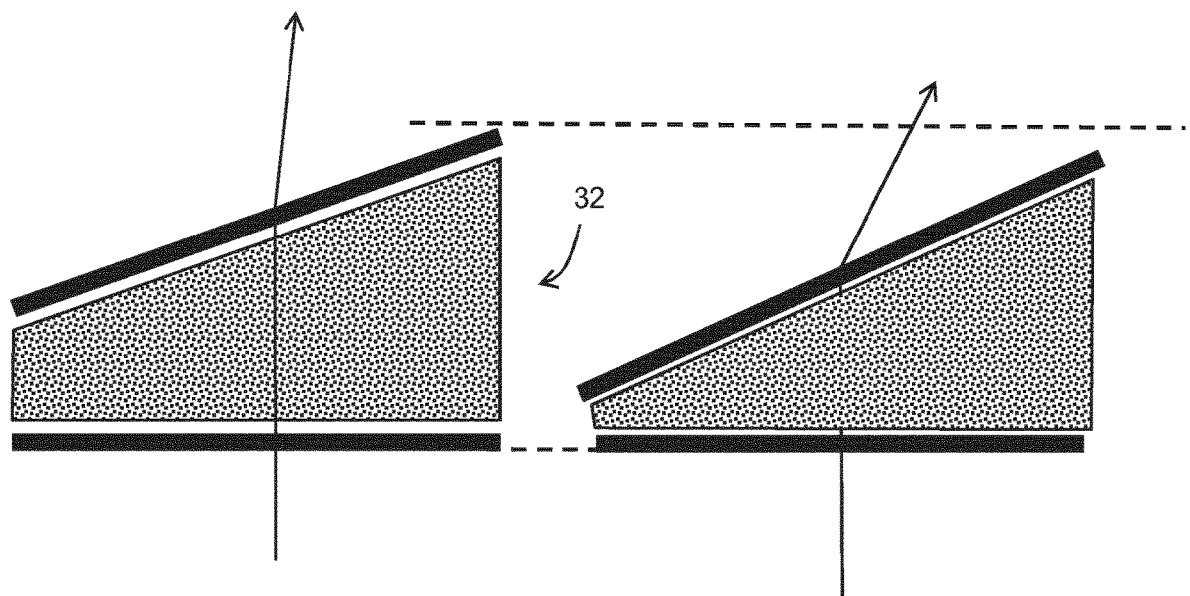
FIG. 5 shows an implementation of a light transmissive optical component as a beam directing component.

FIG. 5 shows an implementation as a beam directing component. The layer structure 32 has a different refractive index to the material outside the device. The refractive index can be tuned by adding particles to the electroactive material layer. The top surface provides a refractive redirection of the incident light. The actuation causes a change in angle of the top face so that a different beam directing function is achieved.

The deflection angle changes as the angular orientation of the interface between materials with different refractive index on either side changes.

Figure 6:
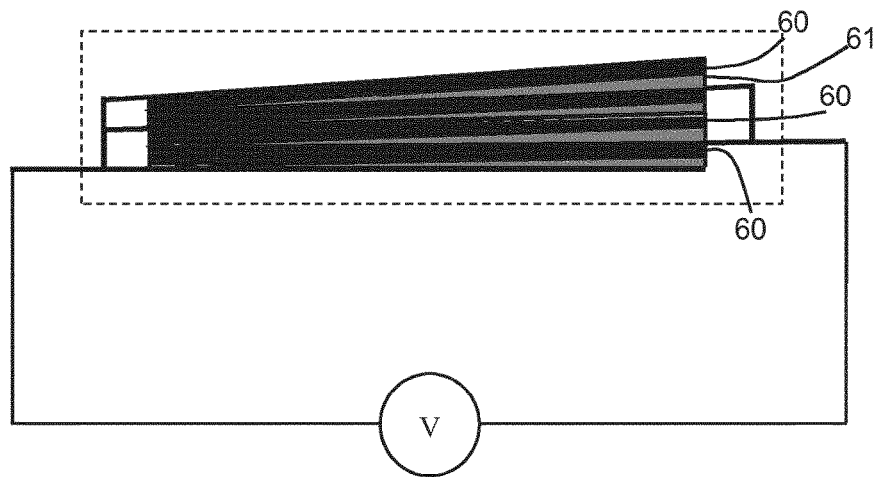
FIG. 6 shows an example of a stack of electroactive material layers of constant thickness, with wedge shaped dielectric intermediate layers.

The examples above all make use of one or more electroactive material layers with non-uniform thickness. The same effect can be achieved with layers of uniform thickness, with tapered (or other shaped) intermediate dielectric layers. FIG. 6 shows an example of a stack of electroactive material layers 60 of constant thickness, with wedge shaped dielectric intermediate layers 61.

In regions of thicker intermediate layers, the electric field strength in the electroactive material layers becomes smaller because of the larger distance and thus the activation/deflection in this region will be smaller, even though the electroactive material layers have constant thickness. The intermediate layers 61 are wedge-shaped adhesive layers, and there are top and bottom electrodes. There may alternatively be electrode layers for each intermediate layer and electroactive material layer pair.

It can be seen that in general a desired non uniform thickness (e.g. wedge shape) may be implemented in any one or more of the electro active material layers, the intermediate glue layers or the electrode layers.

The thickness variation is not limited to a wedge shape. For example, other shapes such as a donut-like configuration are possible, where the middle of the device behaves differently to the outer circumference.

Figure 7:
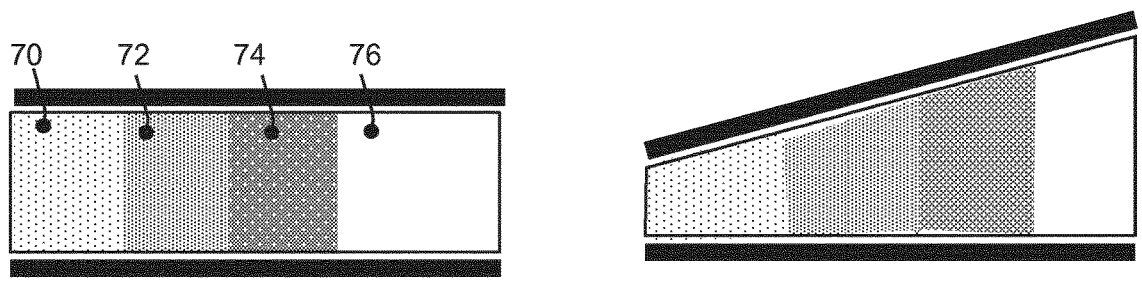
FIG. 7 shows a variation of a light transmissive optical component in which the non-actuated state has uniform thickness.

The designs above all have a non-uniform thickness in the relaxed (non-actuated) state. However, this is not essential. FIG. 7 shows a variation in which the non-actuated state has uniform thickness. The electroactive material layer structure 32 has regions 70, 72, 74, 76 of different dielectric constant, by for instance locally increasing a filler concentration of higher dielectric constant particles.

The result is that a uniform voltage applied to the electrodes will give rise to different electric field strength in different parts of the layer. As a result, different parts will respond differently to the actuation signal as shown in the right image, giving a non-uniform thickness in the actuated state. This approach can be combined with any of the options described above.

The examples above all make use of a single global actuation signal applied to the whole device, and the local device geometry or physical/electrical properties result in a non-uniform deformation.

Figure 8:
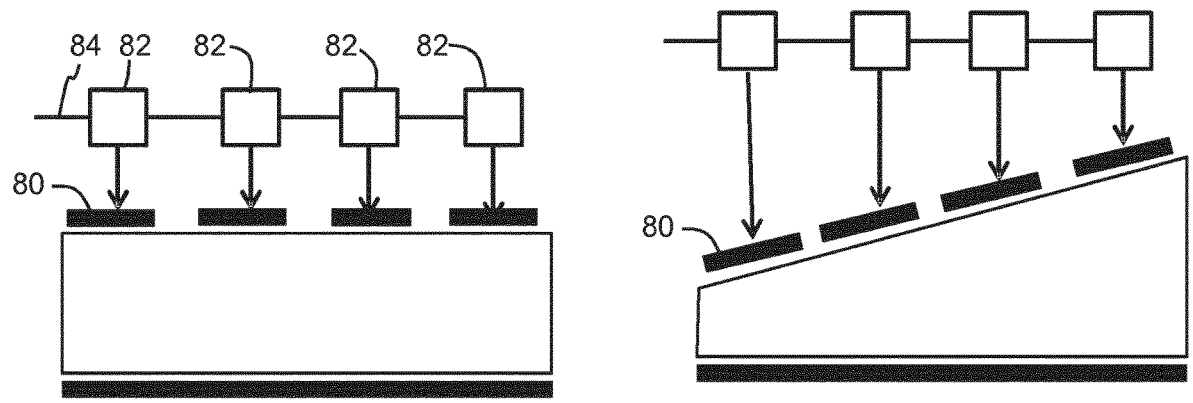
FIG. 8 shows a variation of a light transmissive optical component which makes use of a segmented electrode design.

An alternative approach is shown in FIG. 8. One electrode (or it could be both) is formed as a set of sub-electrodes 80. These enable variation in the charge or applied voltage over the surface of the device. This leads to a variation in optical properties (which may be any of the options described above, namely color conversion, absorption, scattering, steering). This can be achieved by applying discrete electrode sections. This option can be combined with any of the other approaches descried above to further increase the effect.

FIG. 8 shows the device in the non-actuated and actuated states.

In FIG. 8, only the top electrode is segmented, for example formed as sub-electrode stripes, and there is a common ground on the bottom. Each electrode pair (between one top sub-electrode and the common ground) is operated at a different voltage amplitude. The smaller the operating amplitude, the smaller the deflection will be in the region. Non-linear wedge shapes or wavy-shapes may be realized.

Each sub-electrode may be provided with its own control signal. However, an alternative which is shown in FIG. 8 is for each sub-electrode to be associated with a signal processing unit 82 for processing a shared electrode drive signal 84 to derive modified local electrode drive signals.

The units 82 may for example comprise a resistive network such as a voltage divider comprising small surface mount device components attached between the sub-electrodes. They may be used to reduce internally the voltage amplitudes for individual electrode pairs. The units 82 may instead comprise a reactive network, for example to introduce a certain timing behavior and/or limit the charge delivered to each electrode-pair. A capacitive voltage divider may for example be used, or a capacitor in series with each sub-electrode.

Another approach to realize the non-uniform thickness, such as a wedge shape, is to add or embed locally soft particles (e.g. silicone nanoparticles) to the electroactive material layer. In the region where the soft particles are provided, the deflection would be hindered and hence be smaller.

It can be seen that the non-uniform thickness variation can be achieved based on a combination of one or more effects:
- an electroactive material layer or layer stack which has non-uniform thickness in the non-actuated state, either based on electroactive layers of non-uniform thickness or intermediate layers or electrodes of non-uniform thickness;
- an electroactive material layer or layer stack which has non-uniform dielectric properties across its area;
- an electroactive material layer or layer stack which has different actuation signals applied at different regions;
- an electroactive material layer or layer stack which has non-uniform physical deformation properties such as softness at different regions.

Although in the detailed description herein above the construction and operation of devices and systems according to the invention have been described for EAPs, the invention can in fact be used for devices based on other kinds of EAM material. Hence, unless indicated otherwise, the EAP materials hereinabove can be replaced with other EAM materials. Such other EAM materials are known in the art and the person skilled in the art will know where to find them and how to apply them. A number of options will be described herein below.

A common sub-division of EAM devices is into field-driven and current or charge (ion) driven EAMs. Field-driven EAMs are actuated by an electric field through direct electromechanical coupling, while the actuation mechanism for current or charge driven EAMs involves the diffusion of ions. The latter mechanism is more often found in the corresponding organic EAMs such as EAPs. While field driven EAMs generally are driven with voltage signals and require corresponding voltage drivers/controllers, current driven EAMs generally are driven with current or charge signals sometimes requiring current drivers. Both classes of materials have multiple family members, each having their own advantages and disadvantages.

Field driven EAMs can be organic or inorganic materials and if organic can be single molecule, oligomeric or polymeric. For the current invention they are preferably organic and then also oligomeric or even polymeric. The organic materials and especially polymers are an emerging class of materials of growing interest as they combine the actuation properties with material properties such as light weight, cheap manufacture and easy processing.

The field driven EAMs and thus also EAPs are generally piezoelectric and possibly ferroelectric and thus comprise a spontaneous permanent polarization (dipole moment). Alternatively, they are electrostrictive and thus comprise only a polarization (dipole moment) when driven, but not when not driven. Alternatively they are dielectric relaxor materials. Such polymers include, but are not limited to, the subclasses: piezoelectric polymers, ferroelectric polymers, electrostrictive polymers, relaxor ferroelectric polymers (such as PVDF based relaxor polymers or polyurethanes), dielectric elastomers, liquid crystal elastomers. Other examples include electrostrictive graft polymers, electrostrictive paper, electrets, electroviscoelastic elastomers and liquid crystal elastomers.

The lack of a spontaneous polarization means that electrostrictive polymers display little or no hysteretic loss even at very high frequencies of operation. The advantages are however gained at the expense of temperature stability. Relaxors operate best in situations where the temperature can be stabilized to within approximately 10° C. This may seem extremely limiting at first glance, but given that electrostrictors excel at high frequencies and very low driving fields, then the applications tend to be in specialized micro actuators. Temperature stabilization of such small devices is relatively simple and often presents only a minor problem in the overall design and development process.

Relaxor ferroelectric materials can have an electrostrictive constant that is high enough for good practical use, i.e. advantageous for simultaneous sensing and actuation functions. Relaxor ferroelectric materials are non-ferroelectric when zero driving field (i.e. voltage) is applied to them, but become ferroelectric during driving. Hence there is no electromechanical coupling present in the material at non-driving. The electromechanical coupling becomes non-zero when a drive signal is applied and can be measured through applying the small amplitude high frequency signal on top of the drive signal, in accordance with the procedures described above. Relaxor ferroelectric materials, moreover, benefit from a unique combination of high electromechanical coupling at non-zero drive signal and good actuation characteristics.

The most commonly used examples of inorganic relaxor ferroelectric materials are: lead magnesium niobate (PMN), lead magnesium niobate-lead titanate (PMN-PT) and lead lanthanum zirconate titanate (PLZT). But others are known in the art.

PVDF based relaxor ferroelectric based polymers show spontaneous electric polarization and they can be pre-strained for improved performance in the strained direction. They can be any one chosen from the group of materials herein below.

Polyvinylidene fluoride (PVDF), Polyvinylidene fluoride-trifluoroethylene (PVDF-TrFE), Polyvinylidene fluoride-trifluoroethylene-chlorofluoroethylene (PVDF-TrFE-CFE), Polyvinylidene fluoride-trifluoroethylene-chlorotrifluoroethylene) (PVDF-TrFE-CTFE), Polyvinylidene fluoride-hexafluoropropylene (PVDF-HFP), polyurethanes or blends thereof.

The current driven EAMs and EAPs comprise conjugated polymers, Ionic Polymer Metal Composites, ionic gels and polymer gels.

Examples of ionic-driven EAPs are conjugated polymers, carbon nanotube (CNT) polymer composites and Ionic Polymer Metal Composites (IPMC).

The sub-class dielectric elastomers includes, but is not limited to:

acrylates, polyurethanes, silicones.

The sub-class conjugated polymers includes, but is not limited to:

polypyrrole, poly-3,4-ethylenedioxythiophene, poly(p-phenylene sulfide), polyanilines.

The materials above can be implanted as pure materials or as materials suspended in matrix materials. Matrix materials can comprise polymers.

To any actuation structure comprising EAM material, additional passive layers may be provided for influencing the behavior of the EAM layer in response to an applied drive signal.

The actuation arrangement or structure of an EAP device can have one or more electrodes for providing the control signal or drive signal to at least a part of the electroactive material. Preferably the arrangement comprises two electrodes. The EAP may be sandwiched between two or more electrodes. This sandwiching is needed for an actuator arrangement that comprises an elastomeric dielectric material, as its actuation is among others due to compressive force exerted by the electrodes attracting each other due to a drive signal. The two or more electrodes can also be embedded in the elastomeric dielectric material. Electrodes can be patterned or not.

It is also possible to provide an electrode layer on one side only for example using interdigitated comb electrodes. If electrodes are on one side only, a reflective device may be formed without the need for transparent electrodes.

A substrate can be part of the actuation arrangement. It can be attached to the ensemble of EAP and electrodes between the electrodes or to one of the electrodes on the outside.

The electrodes may be stretchable so that they follow the deformation of the EAM material layer. This is especially advantageous for EAP materials. Materials suitable for the electrodes are also known, and may for example be selected from the group consisting of thin metal films, such as gold, copper, or aluminum or organic conductors such as carbon black, carbon nanotubes, graphene, poly-aniline (PANI), poly(3,4-ethylenedioxythiophene) (PEDOT), e.g. poly(3,4-ethylenedioxythiophene) poly(styrenesulfonate) (PEDOT:PSS). Metalized polyester films may also be used, such as metalized polyethylene terephthalate (PET), for example using an aluminum coating.

The materials for the different layers will be selected for example taking account of the elastic moduli (Young's moduli) of the different layers.

Additional layers to those discussed above may be used to adapt the electrical or mechanical behavior of the device, such as additional polymer layers.

At least some examples above make use of composite materials which combine an electroactive material (in particular a polymer) and other particles (which will be termed generally as a "filler") for changing the optical properties, such as wavelength shifting, scattering, absorbing, or changing the dielectric permittivity. There may be solid particles or liquid or gel droplets within a binding matrix, or encapsulated droplets effectively forming particles. Most preferably, solid particles are used.

The way such composite materials can be manufactured will now be discussed as well as the effects on the physical and electrical properties of the electroactive material.

The example of dielectric elastomer electroactive materials will first be presented. These are sandwiched between two electrodes to create dielectric electroactive polymer actuators. Silicone rubbers are the main applied elastomer group. The deformation is the result of attractive forces between the positively and negatively charged electrodes.

Compounding of particles in silicones is widely used on an industrial scale. As an example ultrasound transducer lenses are made of silicone (PDMS, Polydimethylsiloxane) filled with iron and silicon oxide particles to increase acoustic impedance and wear resistance. PDMS (silicone) compounds containing rutile (TiO2) are widely used to increase the refractive index or to create white reflecting materials.

With respect to the performance of a dielectric electroactive polymer, compounding with non-conducting hard particles such as ceramics has two main significant effects. First, the stiffness of the material increases requiring larger forces to obtain the same strain levels. Another effect is that the dielectric constant of the composite changes (in general that of the filler will be higher than that of silicones, which is close to 3). Whether the strain effect depending on voltage is positive or negative depends on the dielectric constant of the particles and on particle size as more small particles have a larger effect on stiffness.

This is discussed in S. Somiya, "Handbook of Advanced Ceramics: Materials, Applications, Processing, and Properties," in Nonlinear Dielectricity of MLCCs, Waltham, Academic Press, 2013, p. 415. By way of example, adding particles increases the dielectric constant but also increases the stiffness.

Thus, compounding fillers into elastomers to influence the properties of a dielectric electroactive polymer is known. Adding high dielectric constant particles to increase the dielectric constant of the elastomer has been widely investigated.

Figure 9:
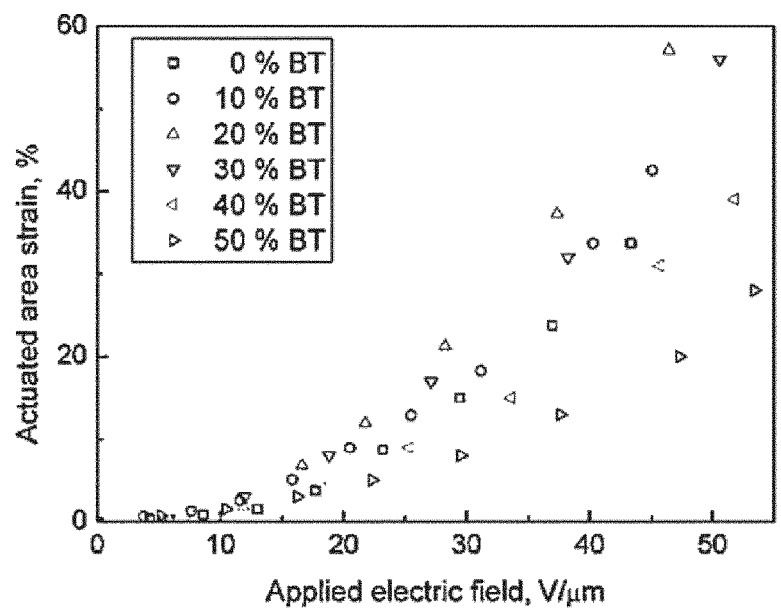
FIG. 9 shows the effect of adding a filler to an EAP material, and shows the strain versus the applied electric field for different particle concentrations.

FIG. 9 shows the effect of adding BaTiO3 to a silicone elastomer in an EAP. It shows the strain versus the applied electric field for different particle concentrations, wherein the particles are 1 μm particles of density 6 g/cm3. At around 20 wt % the EAP strain as a function of field strength is enlarged, as the positive effect of the increased dielectric constant outweighs the negative effect of the increased stiffness.

Increasing the dielectric constant increases the strain depending on voltage whereas the increase in stiffness decreases strain.

Silicone elastomers are in general prepared by mixing two components. One of them contains a Pt or peroxide curing catalyst. The different components can be mixed in a high speed mixer. In the same process, the filler can be added or the filler may already be premixed in one or both components. The filler material is in general applied in a solvent which evaporates during processing. After or during mixing in a high speed mixer in general vacuum is applied to remove air (and or solvents) inclusions. After this the mixture can be casted and cured. Curing temperature and time depends on the polymer grade but is typically around 80° C. for 10 minutes. Most particles are compatible with silicones as long as they do not inactivate the catalyst (for instance sulphur containing materials). Peroxide curing silicones are less sensitive.

Silicones can be injection molded (liquid silicone rubbers, LSR). The two components are injected on a screw, after passing a (static) mixer, of the LSR injection molding machine. The filler particles may be pre-mixed in one or both components. The material is transported by a cold screw and injected into a hot mold where it cures fast depending on temperature. As the LSR has very low viscosity very thin sections can be realized. Typical curing temperatures are close to 180° C. and times around 30 seconds to one minute.

Besides casting and injection molding a number of other shaping technologies are available to produce silicon rubber compound components also in the form of thin films. Examples are extrusion (foils and profiles), rolling of foils, lamination and rolling of multilayers, doctor blade film casting, spin coating and screen printing.

The filling can be performed locally at the point of manufacture, for example by using multi shot injection molding (2 shot or overmolding), silicone dispensing and over casting or silicone additive manufacturing (i.e. 3D printing)

The example of piezoelectric polymer composites will next be presented.

Piezoelectric polymer composites containing a compound of PVDF (a matrix polymer) and ceramic particles such as PZT have been investigated. Manufacturing technologies like solvent casting and spin coating are suitable. Also, cold and hot pressing techniques are suitable. After dissolving the PVDF, evaporation of solvent until a viscous mix is obtained and mixing in the filler particles may then be performed. PVDF polymer based composites with a well dispersed grain size distribution and intact polymer matrix may be realized.

The example of relaxor electrostrictive polymer actuators will next be presented.

These are a class of semi crystalline terpolymers that can deliver a relatively high force with medium strain. Therefore these actuators have a wide range of potential applications. Relaxor electrostrictive polymers have been developed from "normal" PVDF polymers by employing proper defect modifications. They contain: vinylidene fluoride (VDF), trifluoroethylene (TrFE), and 1,1-chlorofluoroethylene (CFE) or Chlorotrifluoro ethylene (CTFE).

Addition of defects in the form of chemical monomers, like 1,1-chlorofluoroethylene (CFE) which are copolymerized with the VDF-TrFE, eliminate the normal ferroelectric phase, leading to a relaxor ferroelectric with electromechanical strain greater than 7% and an elastic energy density of 0.7 J/cm3 at 150 MV/m. Furthermore is has been described that by introducing defects via high electron irradiation of the P(VDF-TrFE) copolymers, the copolymer can also be converted from a "normal" ferroelectric P(VDFTrFE) into a ferroelectric relaxor.

The materials may be formed by polymer synthesis as described in F. Carpi and et. al, "Dielectric Elastomers as Electromechanical Transducers: Fundamentals, Materials, Devices, Models and Applications of an Emerging Electroactive Polymer Technology," Oxford, Elsevier, 2011, p. 53. This discloses a combination of a suspension polymerization process and an oxygen-activated initiator. This films can be formed by pouring the solution on a glass substrate and then evaporating the solvent.

The desired filler can be added to the solvent before film casting. After casting, the composite can then be annealed to remove the solvent and increase crystallinity. The crystallization rate can reduce depending on filler concentration and particle size distribution. Stretching will align molecule chains and will become more difficult as particles can pin molecular chains. The dielectric constant will increase for most additives which reduces the required actuation voltage to reach a certain strain. The material stiffness will increase reducing strain.

The manufacturing process thus involves forming a polymer solution, adding particles, mixing, followed by casting (e.g. tape casting) potentially combined with lamination. Alternatives are spin coating, pressing etc.

Local variations in concentration can be realized using dispensing and or 3D solvent printing. Layer thicknesses between 10 to 20 μm are for example possible with 3D printing processes.

In all examples, the addition of the filler generally has an effect on the breakdown voltage. The maximum strain that can be reached with an electroactive polymer is determined by the maximum voltage that can be applied, which is the breakdown voltage (or dielectric strength).

The breakdown voltage of polymers is related to the dissociation of polymer molecules under an applied external field. The addition of filler particles in a polymer matrix can have a significant influence on the breakdown voltage. Especially larger particles can locally increase fields. Therefore compounding polymers with particles in the sub-micron range has a lower negative effect on voltage breakdown. Furthermore the polymer-filler interface structure can strongly influence voltage breakdown.

Agglomeration of particles is another effect that reduces breakdown voltage. However, by modifying particle surfaces, preventing agglomeration and improving the interface structure, the negative effect of voltage breakdown levels can be reduced. However, the filled polymers will obtain a lower breakdown strength than unfilled polymers, leading to lower actuation strain.

In conclusion, for dielectric electroactive polymers, compounding with particles can be achieved using a wide range of industrial compounding and shaping technologies. In order to keep the effect on stiffness and therefore stroke reduction for an actuator limited, smaller concentrations are preferred. For a given volume concentration, not too small particles are also preferred to keep the effect on stiffness limited. A soft base polymer can be selected to compensate for the rise in stiffness. Increased dielectric constant can enable actuation at reduced voltages. In order to maintain the dielectric strength, particle size and concentration should be limited and measures can be taken to improve the polymer-filler interface as well as particle dispersion. Local concentration variations can be printed.

For relaxor type electro active polymers compounding with particles is also possible. Similar trends with respect to the influence of particle concentration and size, on stiffness and dielectric strength are comparable to the effects described above. Particles can be added after polymerization. Dissolved polymers can be shaped using various technologies such as tape casting and spin coating. Also local concentration variations are possible.

Various different filler particles may be used.

For light absorbing or light scattering filler particles, a size is desired that is significant with respect to the wavelength of light, such as more than ⅒ of the wavelength. Thus, the particles typically have a linear dimension from 20 nm up to multiple micrometers. In general, the particle size should not be large compared to the thickness of the electroactive material layer or sub layer as this can influence performance. Of course if even smaller particles agglomerate they will still absorb or scatter light.

Light absorbing particles may for example have a carbon base such as graphite or carbon black or dark ceramic particles such as carbides, Light scattering particles or refractive index tuning particles are selected to have a significant refractive index difference with the matrix. Examples of suitable materials are one or more oxides selected from $TiO_2$, $ZrO_2$, $Y_2O_3$, NiO, $Cr_2O_3$, $V_2O_3$, ZnO, CuO, $Bi_2O_3$ and $HfO_2$ or non-oxides ceramic particles such as CdS.

These particles enable tuning of the refractive index of the electroactive material. By making the particle size small compared to the wavelength of the light being processed, light absorption and scattering is reduced.

For color conversion particles, phosphor particles may be used, which need to interact with the light. Therefore the diameter should not be much shorter than the wavelength of light. Very small but many particles have the same color conversion as a few larger ones. However, many small particles increase the stiffness more, thereby limiting actuation. In most cases EAPs have a multilayer structure to reduce driving voltage, and the sub layers are a few microns thick. The stacked multilayer is for example 100 μm thick. The particles will be significantly thinner than the layer or sub layer thickness. The particles for example have around 1 μm diameter, and generally between 30 nm and 3 μm.

Light conversion particles may be phosphors, ceramics, polymers, quantum dots, and they may be organic or inorganic. Ceramic particles are the most easy to implement and will be very stable in a polymer matrix:

Sine examples of ceramic phosphors are
YAG:Ce (yellow)
GdYAG:Ce (yellow)
$CaAlSiN_3$:Eu (red) Ca can be replaced by Sr or Ba.
(Zn, Cd)S:Ag (yellow)
ZnS:Cu (green)

Some examples of quantum dots (wherein the size determines wavelength of emission) are:
CdSe/GdS (core/shell)
InP/ZnS
CuInS/ZnS Organic phosphors and organometallic phosphors may also be used.

It can be seen from the examples above that the invention may be applied to generate an intensity pattern and/or a scattering pattern and/or a color pattern which varies upon actuation. This enables illumination conditions to be changed in a more complete way than simple intensity or direction control. An example of adaptive automotive lighting has been given above. There are many other applications where functional or aesthetic lighting conditions are made adjustable.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:
1. A light transmissive optical component comprising:
an electroactive material layer structure, the electroactive material layer structure comprising an optically active layer, wherein the optically active layer is arranged to implement an optical function;
an electrode arrangement, wherein the electrode arrangement is arranged to control deformation of the electro- active material layer structure thereby to change a light transmission property of the light transmissive optical component; and a drive arrangement,
  wherein the drive arrangement is arranged to control drive signals,
  wherein the drive signals are applied to the electrode arrangement, and
  wherein the drive arrangement is arranged to induce different relative thickness changes at different regions of the electroactive material layer structure thereby providing non-uniform change in optical function between the different regions of the electroactive material layer structure,
wherein the electroactive material layer structure comprises a stack of electroactive material layers separated by intermediate layers,
wherein the electroactive material layers have uniform thickness, and
wherein the intermediate layers have non-uniform thickness such that the electroactive material layer structure has a non-uniform thickness in its non-actuated state.

2. The light transmissive optical component as claimed in claim 1, wherein at least some of the different regions of the electroactive material layer structure have a different dielectric constant.

3. The light transmissive optical component as claimed in claim 2,
  wherein the electroactive material layer structure comprises a composite of an electroactive material and particles, and
  wherein the particles are arranged to locally modify the dielectric constant.

4. A light transmissive optical component comprising:
an electroactive material layer structure, the electroactive material layer structure comprising an optically active layer, wherein the optically active layer is arranged to implement an optical function;
an electrode arrangement, wherein the electrode arrangement is arranged to control deformation of the electroactive material layer structure thereby to change a light transmission property of the light transmissive optical component; and
a drive arrangement,
  wherein the drive arrangement is arranged to control drive signals,
  wherein the drive signals are applied to the electrode arrangement,
  wherein the drive arrangement is arranged to induce different relative thickness changes at different regions of the electroactive material layer structure thereby providing non-uniform change in optical function between the different regions of the electroactive material layer structure, and
  wherein at least some of the different regions of the electroactive material layer structure have a different dielectric constant.

5. The light transmissive optical component as claimed in claim 4,
  wherein the electroactive material layer structure comprises a composite of an electroactive material and particles, and
  wherein the particles are arranged to locally modify the dielectric constant.

6. The light transmissive optical component as claimed in claim 1, wherein the electrode arrangement comprises an array of electrodes such that different actuation signals are applied to the different regions of the electroactive material layer structure.

7. The light transmissive optical component as claimed in claim 6,
  wherein the electrode arrangement comprises at least two electrodes,
  wherein each electrode is associated with a signal processing unit, and
  wherein each signal processing unit is arranged to process a shared electrode drive signal to derive modified local electrode drive signals.

8. The light transmissive optical component as claimed in claim 1, wherein the electroactive material layer structure comprises a partial light absorbing layer.

9. The light transmissive optical component as claimed in claim 1, wherein the electroactive material layer structure comprises a refracting layer.

10. The light transmissive optical component as claimed in claim 1, wherein the electroactive material layer structure is a light color change layer structure.

11. The light transmissive optical component as claimed in claim 10, wherein the electroactive material layer structure comprises a composite of an electroactive material and color change particles.

12. The light transmissive optical component as claimed in claim 11, wherein the color change particles comprise phosphor particles.

13. The light transmissive optical component as claimed in claim 1, wherein the electroactive material layer structure is a light direction control layer.

14. The light transmissive optical component as claimed in claim 1, wherein at least some of the different regions of the electroactive material layer structure have a different stiffness.

15. The light transmissive optical component as claimed in claim 1, wherein the electroactive material layer structure comprises a light scattering layer.

16. The light transmissive optical component as claimed in claim 1, wherein the electroactive material layer structure comprises a composite of an electroactive material and light absorbing particles.

17. The light transmissive optical component as claimed in claim 14,
  wherein the electroactive material layer structure comprises a composite of an electroactive material and particles, and
  wherein the particles are arranged to locally modify the stiffness.

18. A light transmissive optical component comprising:
an electroactive material layer structure, the electroactive material layer structure comprising an optically active layer, wherein the optically active layer is arranged to implement an optical function;
an electrode arrangement, wherein the electrode arrangement is arranged to control deformation of the electroactive material layer structure thereby to change a light transmission property of the light transmissive optical component; and
a drive arrangement,
  wherein the drive arrangement is arranged to control drive signals,
  wherein the drive signals are applied to the electrode arrangement,
  wherein the drive arrangement is arranged to induce different relative thickness changes at different regions of the electroactive material layer structure thereby providing non-uniform change in optical function between the different regions of the electroactive material layer structure, and wherein at least some of the different regions of the electroactive material layer structure have a different stiffness.

19. The light transmissive optical component as claimed in claim 4, wherein the electrode arrangement comprises an array of electrodes such that different actuation signals are applied to the different regions of the electroactive material layer structure.

20. The light transmissive optical component as claimed in claim 4, wherein the electroactive material layer structure is a light direction control layer.

\* \* \* \* \*